United States Patent
Miyamoto

(10) Patent No.: US 9,235,370 B2
(45) Date of Patent: Jan. 12, 2016

(54) IMAGE FORMING SYSTEM AND COMPUTER READABLE MEDIUM CONTAINING PROGRAM

(71) Applicant: Yoshio Miyamoto, Tokyo (JP)

(72) Inventor: Yoshio Miyamoto, Tokyo (JP)

(73) Assignee: KONICA MINOLTA BUSINESS TECHNOLGIES, INC., Tokyo (JP)

( * ) Notice: Subject to any disclaimer, the term of this patent is extended or adjusted under 35 U.S.C. 154(b) by 161 days.

(21) Appl. No.: 13/718,049

(22) Filed: Dec. 18, 2012

(65) Prior Publication Data

US 2013/0163047 A1 Jun. 27, 2013

(30) Foreign Application Priority Data

Dec. 22, 2011 (JP) .................................. 2011-281361

(51) Int. Cl.
 *G06F 3/12* (2006.01)
(52) U.S. Cl.
 CPC .............. *G06F 3/1296* (2013.01); *G06F 3/125* (2013.01); *G06F 3/1211* (2013.01); *G06F 3/1291* (2013.01)
(58) Field of Classification Search
 CPC ..... G06F 3/1211; G06F 3/125; G06F 3/1291; G06F 3/1296
 USPC .................................................. 358/1.1, 1.15
 See application file for complete search history.

(56) References Cited

U.S. PATENT DOCUMENTS

| | | | |
|---|---|---|---|
| 7,433,623 B2 | 10/2008 | Nakamura et al. | |
| 2007/0279476 A1* | 12/2007 | Baba et al. | 347/190 |
| 2010/0098472 A1* | 4/2010 | Kawamura et al. | 399/374 |

FOREIGN PATENT DOCUMENTS

| | | |
|---|---|---|
| JP | 2001-287421 A | 10/2001 |
| JP | 2003-296051 A | 10/2003 |
| JP | 2005-225123 A | 8/2005 |
| JP | 2005289542 A | 10/2005 |
| JP | 2006106668 A | 4/2006 |
| JP | 2007-320123 A | 12/2007 |
| JP | 2010036546 A | 2/2010 |

OTHER PUBLICATIONS

English translation for JP 2001-287421.*
Japanese Office Action dated Jan. 28, 2014 (and English translation thereof) in counterpart Japanese Application No. 2011-281361.
Japanese Office Action dated Nov. 11, 2014, issued in counterpart Japanese Application No. 2011-281361.

* cited by examiner

*Primary Examiner* — Iriana Cruz
(74) *Attorney, Agent, or Firm* — Holtz, Holtz, Goodman & Chick PC

(57) ABSTRACT

An image forming system includes a plurality of image forming apparatuses, a determining unit, and a control unit. The image forming apparatuses are connected in series in a paper conveyance direction, and include first and second image forming apparatuses. The second image forming apparatus is disposed downstream of the first image forming apparatus in the paper conveyance direction. The determining unit determines whether image data is front-side data or back-side data at a time of duplex printing. The control unit controls the first image forming apparatus to print an image based on the back-side data, and controls the second image forming apparatus to print an image based on the front-side data.

12 Claims, 6 Drawing Sheets

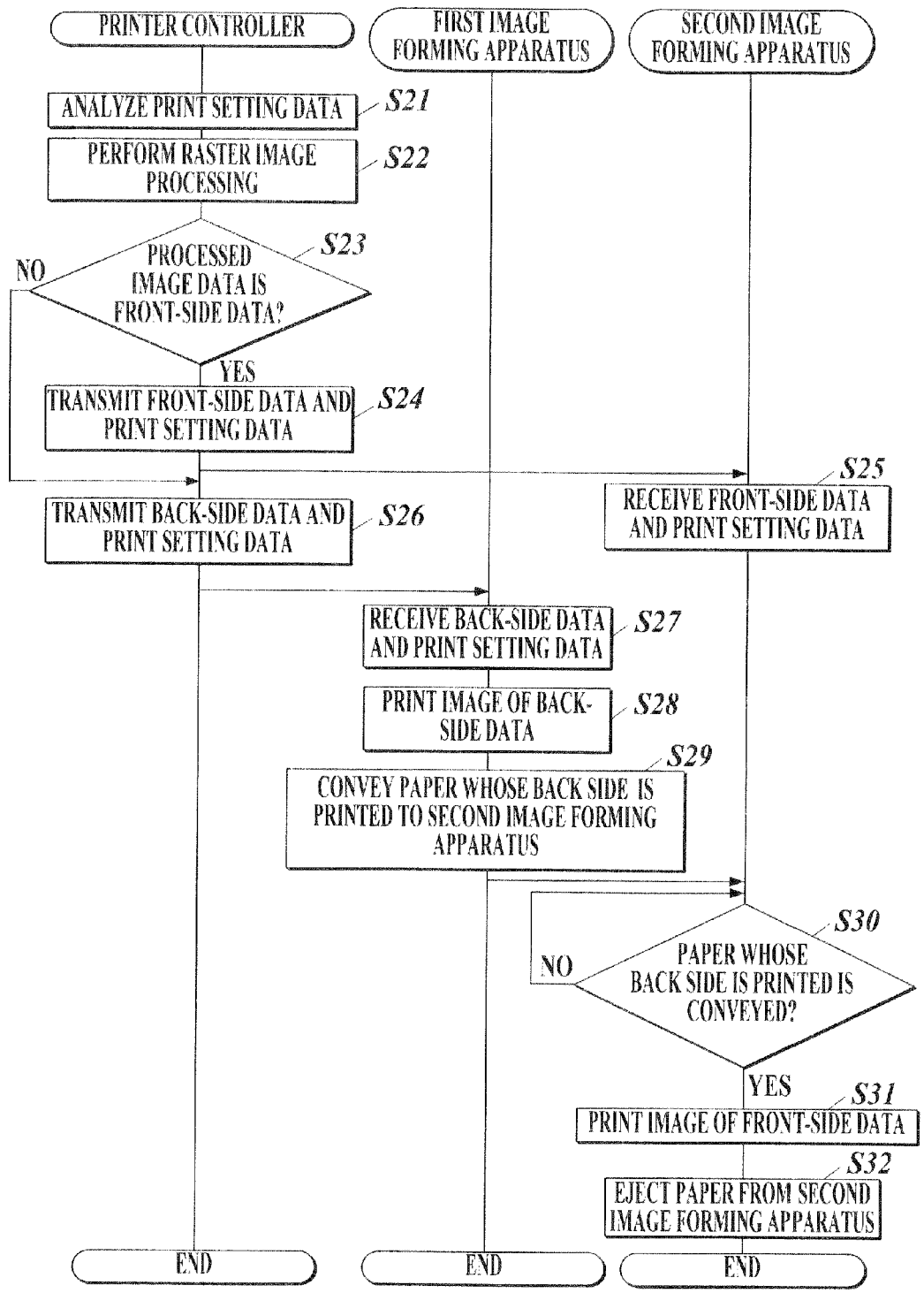

IMAGE FORMING SYSTEM AND COMPUTER READABLE MEDIUM CONTAINING PROGRAM

BACKGROUND OF THE INVENTION

1. Field of the Invention

The present invention relates to an image forming system and a computer readable medium containing a program.

2. Description of Related Art

There have been known image forming systems including two image forming apparatuses connected in series in the paper conveyance direction. When such image forming systems perform duplex printing, the first image forming apparatus disposed upstream in the paper conveyance direction prints an image on the front side of paper, and the second image forming apparatus disposed downstream in the paper conveyance direction prints an image on the back side the of paper, for example.

Japanese Unexamined Patent Application Publication No. 2005-225123 discloses a tandem continuous-form printer that prints an image on one side of paper with a first printer engine, and prints an image on the other side of the paper with a second printer engine when a duplex printing mode is selected.

Japanese Unexamined Patent Application Publication No. 2005-225123, however, does not disclose or suggest which of the image data corresponding to the front side of paper and the image data corresponding to the back side of the paper is to be printed first in a duplex printing mode. In general, in order to perform duplex printing, an additional mechanism has to be provided to allow paper to wait at a predetermined place, such as at a paper turning-over unit, after an upstream image forming apparatus completes printing on one side of paper and before a downstream image forming apparatus is ready for printing on the other side of the paper. In addition, there is a danger that the paper, whose one side is printed, deforms while staying at the turning-over unit until the downstream image forming apparatus is ready for printing on the other side of the paper.

SUMMARY OF THE INVENTION

In view of the above, the present invention provides an image forming system which includes a plurality of image forming apparatuses connected in series in the paper conveyance direction to print images based on image data composed of data of a plurality of pages. In the case where the image forming system performs duplex printing, as soon as printing on one side of paper is completed, printing on the other side of the paper is started. That is, paper does not wait between printing on one side and printing on the other side.

According to a first aspect of the present invention, there is provided an image forming system to print an image based on image data obtained by processing print data composed of data of a plurality of pages in order of page, the image forming system including: a plurality of image forming apparatuses connected in series in a paper conveyance direction, wherein the image forming apparatuses include: a first image forming apparatus that forms an image on paper, and a second image forming apparatus disposed downstream of the first image forming apparatus in the paper conveyance direction; a determining unit that determines whether the image data is front-side data or back-side data at a time of duplex printing, the front-side data corresponding to a front side of the paper, the back-side data corresponding to a back side of the paper; and a control unit that controls the first image forming apparatus to print an image based on the back-side data, and that controls the second image forming apparatus to print an image based on the front-side data.

According to a second aspect of the present invention, there is provided a non-transitory computer readable medium containing a program to allow the computer of an image forming system, which includes a plurality of image forming apparatuses connected in series in a paper conveyance direction to print an image based on image data obtained by processing print data composed of data of a plurality of pages in order of page, to function as: a determining unit that determines whether the image data is front-side data or back-side data at a time of duplex printing, the front-side data corresponding to a front side of paper, the back-side data corresponding to a back side of paper; and a control unit that controls a first image forming apparatus in the image forming system to print an image based on the back-side data, and that controls a second image forming apparatus disposed downstream of the first image forming apparatus in the paper conveyance direction to print an image based on the front-side data.

According to a third aspect of the present invention, there is provided a non-transitory computer readable medium containing a program to allow the computer of an image forming system, which includes a plurality of image forming apparatuses connected in series in a paper conveyance direction to print an image based on image data obtained by processing print data composed of data of a plurality of pages in order of page, to function as: a determining unit that determines whether the image data is front-side data or back-side data at a time of duplex printing, the front-side data corresponding to a front side of paper, the back-side data corresponding to a back side of paper; and a control unit that transmits the back-side data to a first image forming apparatus in the image forming system, and that transmits the front-side data to a second image forming apparatus disposed downstream of the first image forming apparatus in the paper conveyance direction.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is a flowchart illustrating image forming processing by the image forming system of FIG. 5.

DESCRIPTION OF THE PREFERRED EMBODIMENTS

Embodiments of the present invention will now be described below with reference to the accompanying drawings. The scope of the present invention, however, is not limited to examples illustrated in these drawings.

First Embodiment

A first embodiment of the present invention is illustrated with an image forming system 1 which includes two image forming apparatuses connected to a printer controller 10A in series.

Figure 1:
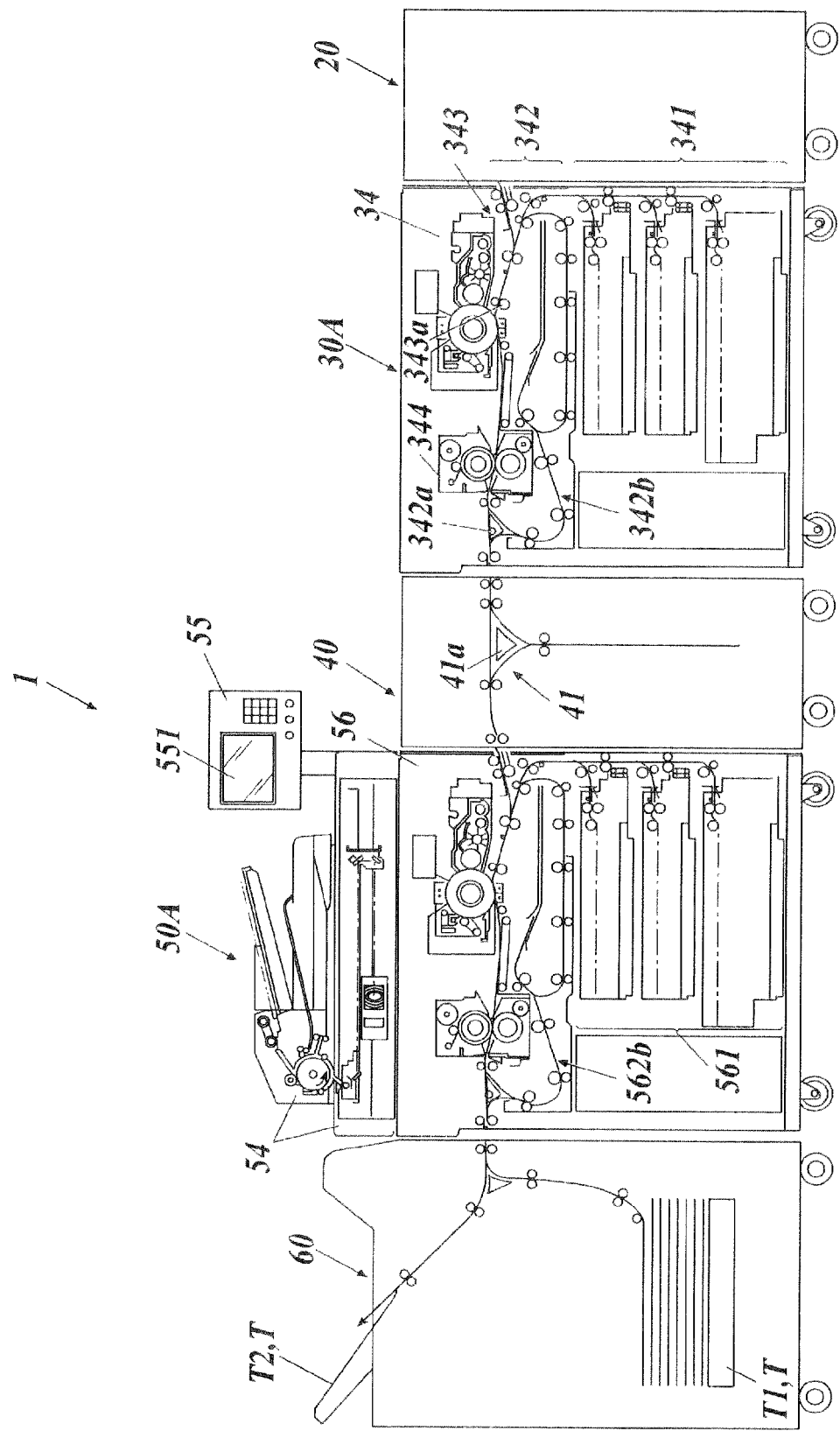
FIG. 1 is a schematic configuration diagram of an image forming system according to an embodiment of the present invention.

As shown in FIG. 1, the image forming system 1 employs a tandem system where a paper feed device 20, a first image forming apparatus 30A, an intermediate unit 40, a second image forming apparatus 50A, and a finisher 60 are connected in series from the upstream in the paper conveyance direction.

When the first image forming apparatus 30A and the second image forming apparatus 50A, which constitute the tandem image forming system 1, are connected, one of the two image forming apparatuses is designated as a main apparatus, and the other is designated as a subordinate apparatus. The main apparatus performs overall management of the image forming system 1, and the subordinate apparatus operates in accordance with instructions of the main apparatus. In the present embodiment, the image forming apparatus (first image forming apparatus 30A) disposed upstream in the paper conveyance direction is designated as a subordinate apparatus, and the image forming apparatus (second image forming apparatus 50A) disposed downstream is designated as a main apparatus among the two image forming apparatuses constituting the image forming system 1. Instead of the two image forming apparatuses in the present embodiment, three or more image forming apparatuses may be connected with one another to constitute the image forming system 1.

When the image forming system 1 in the present embodiment executes a job for duplex printing to form images on both sides of paper, the first image forming apparatus 30A forms an image on the back side of paper; and the second image forming apparatus 50A forms an image on the front side of paper.

When executing a job for duplex printing, the first image forming apparatus 30A forms an image of back-side data on one side of paper conveyed from the paper feed device 20 or from a paper feed unit 341 in the first image forming apparatus 30A. The paper with the image of back-side data printed on its one side is turned over by a turning-over unit 342b in the first image forming apparatus 30A or by the intermediate unit 40. Then, the turned-over paper is conveyed to the second image forming apparatus 50A, where the image of front-side data is formed on the other side of the paper. After that, the paper is conveyed to the finisher 60.

When executing a job for one-side printing mode to print an image only on one side of paper, the first image forming apparatus 30A forms an image on one side of paper conveyed from the paper feed device 20 or from the paper feed unit 341 in the first image forming apparatus 30A. The paper with an image printed on its one side is conveyed to the finisher 60 through the intermediate unit 40 and the second image forming apparatus 50A.

The paper feed device 20 includes a plurality of paper feed trays, paper feed rollers, separation rollers, a paper feed/separation rubber, and sending rollers. Paper is classified beforehand according to its type, such as quality, basis weight, and size. The paper feed trays store respective types of paper. Sheets of paper go out of a paper feed tray one by one in order from the uppermost sheet and are conveyed to a paper conveying unit 342 in the first image forming apparatus 30A.

The first image forming apparatus 30A prints on paper an image read by an image reading unit 54, which is described later, of the second image forming apparatus 50A. Further, the first image forming apparatus 30A receives image data and print setting data from an external device. The image data is in a format such as a page description language (PDL) and TIFF. The print setting data indicates printing conditions for printing the image of the image data on paper. The first image forming apparatus 30A forms an image on paper based on the received image data and print setting data. The first image forming apparatus 30A includes a printing section 34.

The printing section 34 performs image formation processing with an electrophotographic system, and includes units for printing, such as the paper feed unit 341, the paper conveying unit 342, an image forming unit 343, and a fixing unit 344.

Instead of the electrophotographic system employed by the printing section 34 in the present embodiment, another printing system, such as an ink-jet system and a thermal sublimation system, may be employed.

The paper feed unit 341 includes a plurality of paper feed trays, paper feed rollers provided for the respective paper feed trays, separation rollers, a paper feed/separation rubber, and sending rollers. Paper is classified beforehand according to its type, such as quality, basis weight, and size. The paper feed trays store respective types of paper. Sheets of paper go out of a paper feed tray one by one in order from the uppermost sheet and are conveyed to the paper conveying unit 342.

The paper conveying unit 342 conveys paper sent from the paper feed device 20 or the paper feed unit 341 along a paper conveyance path to the image forming unit 343 through a plurality of intermediate rollers and resist rollers. The paper conveying unit 342 then conveys paper to a transfer position in the image forming unit 343. Further, the paper conveying unit 342 conveys paper to the second image forming apparatus 50A. Paper temporarily stops to wait upstream of the resist rollers 343a, and after that, starts to travel downstream of the resist rollers 343a in accordance with a timing of image formation.

The paper conveying unit 342 has the turning-over unit 342b including a conveyance-path switching unit 342a and turning-over rollers. In response to switching operation by the conveyance-path switching unit 342a, the turning-over unit 342b conveys paper, which has passed through the fixing unit 344, to a connected apparatus disposed downstream without turning over the paper; or the turning-over unit 342b switches back paper with the turning-over rollers to turn over the paper and conveys the paper to the connected apparatus disposed downstream. The turning-over unit 342b may include a circulation path to turn over paper which has passed through the fixing unit 344 and to refeed the paper to the image forming unit 343 within the same apparatus.

The image forming unit 343 includes a photoreceptor drum, a charging unit, an exposing unit, a developing unit, a transfer unit, and a cleaning unit. The image forming unit 343 forms an image on a surface of paper based on image data. When the first image forming apparatus 30A forms a color image, the image forming unit 343 is provided for each color.

In the image forming unit 343, the surface of the photoreceptor drum charged by the charging unit is irradiated with light from the exposing unit according to image data to form an electrostatic latent image. The developing unit allows charged toner to adhere to the surface of the photoreceptor drum, on which the electrostatic latent image has been formed, to develop the electrostatic latent image. The photoreceptor drum, to which the toner is adhering, transfers the toner to paper at the transfer position of the transfer unit while the photoreceptor drum rotates at a constant speed. After the toner has been transferred to paper, the cleaning unit removes residual charges and residual toner on the surface of the photoreceptor drum. The removed toner is put in a toner collection box.

The fixing unit 344 includes a fixing heater, a fixing roller, and an external heating member for fixing, and fixes a toner image transferred onto paper by heat.

The intermediate unit 40 is disposed downstream of the first image forming apparatus 30A and upstream of the second image forming apparatus 50A in the paper conveyance direction. The intermediate unit 40 conveys paper, which is sent from the first image forming apparatus 30A, to the second image forming apparatus 50A in accordance with an instruction of the first image forming apparatus 30A.

The intermediate unit 40 has a turning-over unit 41 including a conveyance-path switching unit 41a and turning-over rollers.

When paper to be conveyed to the second image forming apparatus 50A needs to be turned over, paper sent from the first image forming apparatus 30A is conveyed to the turning-over unit 41 in response to a switching operation by the conveyance-path switching unit 41a, and then the paper is switched back to be turned over with the turning-over rollers of the turning-over unit 41. Then, the turned-over paper is conveyed to the second image forming apparatus 50A.

When paper does not need to be turned over, paper sent from the first image forming apparatus 30A is not conveyed to the turning-over unit 41 in response to a switching operation by the conveyance-path switching unit 41a. In this case, paper is conveyed to the second image forming apparatus 50A without being turned over.

The second image forming apparatus 50A includes an image reading unit 54 which reads an image from an original. The second image forming apparatus 50A forms an image on paper based on the read image. Further, the second image forming apparatus 50A receives image data and print setting data from an external device. The image data is in a format such as a page description language (PDL) and TIFF. The print setting data indicates printing conditions for printing the image of the image data on paper. The second image forming apparatus 50A forms an image on paper based on the received image data and print setting data.

The second image forming apparatus 50A includes the image reading unit 54, an operation unit 55, and a printing section 56; and forms an image on paper in cooperation with the first image forming apparatus 30A.

The printing section 56 included in the second image forming apparatus 50A has units for printing, such as a paper feed unit 561, a paper conveying unit including a turning-over unit 562b, an image forming unit, and a fixing unit. Since these units are similar to those included in the printing section 34 of the first image forming apparatus 30A, repetitive explanations are omitted.

The image reading unit 54 includes an auto document feeder (ADF) and a reading unit, and reads images of a plurality of originals based on setting information received at the operation unit 55. An original placed on the tray of the ADF is sent to a contact glass where image(s) on one side or both sides of the original is read with an optical system and a charge coupled device (CCD). Here, the image is not limited to image data of figures and pictures, but includes text data of characters and marks, for example.

The operation unit 55 includes a liquid crystal display (LCD) 551, a touch panel provided to cover the LCD 551, various switches and buttons, a numerical keypad, and a group of operation keys. The operation unit 55 receives instructions of a user, outputs operation signals of the instructions to a control unit 53, which is described later. The operation unit 55 displays on the LCD 551 various setting screens through which various operation instructions and/or setting information is to be input, and displays various operation screens showing various processing results in accordance with display signals output from the control unit 53.

The finisher 60 is disposed downstream of the second image forming apparatus 50A in the paper conveyance direction. The finisher 60 includes various units for a finishing process, such as a sorter, stapler, punch, and folding unit; and paper ejecting trays T, such as a large tray T1 and sub tray T2. The finisher 60 performs a finishing process for paper sent from the second image forming apparatus 50A, and ejects the paper to the large tray T1 or the sub tray T2 after the finishing process. The large tray T1 has a stage to move up and down, which allows the tray T1 to house a stack of paper placed on the stage. Paper placed on the sub tray T2 is exposed to the outside so that a user can see the paper being ejected.

Figure 2:
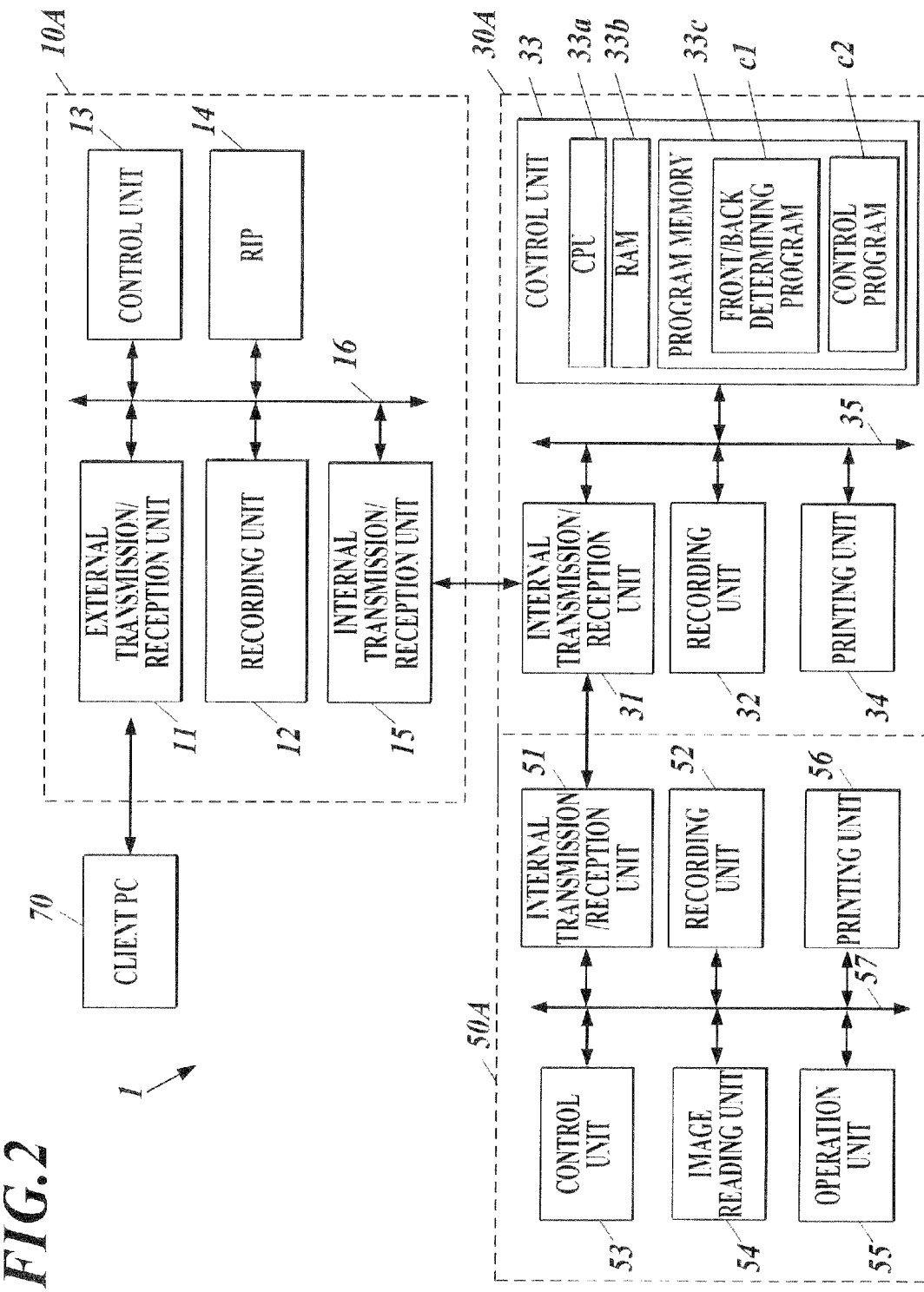
FIG. 2 is a block diagram illustrating main components of the image forming system according to an embodiment of the present invention.

Next, the functional components of the image forming system 1 as shown in FIG. 2 will be described.

As shown in FIG. 2, the image forming system 1 includes a printer controller 10A, the first image forming apparatus 30A, and the second image forming apparatus 50A.

The printer controller 10A includes an external transmission/reception unit 11, a recording unit 12, a control unit 13, a raster image processor (RIP) 14, an internal transmission/reception unit 15, which units are communicatively connected to one another with a bus 16. The printer controller 10A is connected to a client PC 70 on the network to exchange data through the external transmission/reception unit 11. The printer controller 10A is also connected to the first image forming apparatus 30A to exchange data through the internal transmission/reception unit 15.

The external transmission/reception unit 11 includes an interface for communication, such as a network I/F, and receives image data and print setting data through an external device, such as the client PC 70, and a network such as an intranet.

The recording unit 12 records various pieces of data involved in image formation and records data having been processed by various programs involved in image formation. More specifically, the recording unit 12 records image data and print setting data received by the external transmission/reception unit 11, print setting data analyzed by the control unit 13, and image data on which raster image processing has been performed.

The control unit 13 includes a central processing unit (CPU), a random access memory (RAM), and a read only memory (ROM). The control unit 13 reads a program specified from system programs and various application programs stored in the ROM, and expands the specified program in the RAM. The control unit 13 executes various processes in collaboration with the program expanded in the RAM and exerts centralized control over the units of the printer controller 10A.

More specifically, the control unit 13 analyzes the print setting data associated with the image data input from the client PC 70. The control unit 13 transmits the image data and the analyzed print setting data to the first image forming apparatus 30A through the internal transmission/reception unit 15. Here, print setting data means instruction information of a job to be executed by the first image forming apparatus 30A and the second image forming apparatus 50A; and a job means printing to be done by the first image forming apparatus 30A and the second image forming apparatus 50A. Print setting data includes data of, for example, the number of printing sheets, a paper feed tray to be used for printing, and printing conditions such as color printing/black-and-white printing.

The RIP 14 rasterizes image data received by the external transmission/reception unit 11 or image data input by the image reading unit 54. Specifically, the RIP 14 converts the received/input image data from a page description language (PDL) format or TIFF format into a bitmap format, for example. More specifically, the RIP 14 performs raster image processing on image data composed of data of a plurality of pages in order of page from the first page.

The internal transmission/reception unit 15 includes an interface for communication, such as a network I/F, and transmits image data, on which raster image processing has been performed, along with print setting data to the first image forming apparatus 30A through a network such as an intranet. The internal transmission/reception unit 15 receives image data, which is input from the image reading unit 54; and receives print setting data, which is input through the operation unit 55, from an internal transmission/reception unit 51 via an internal transmission/reception unit 31.

As shown in FIG. 2, the first image forming apparatus 30A includes the internal transmission/reception unit 31, a recording unit 32, a control unit 33, and a printing section 34, which are communicatively connected to one another with a bus 35.

The internal transmission/reception unit 31 includes an interface for communication, such as a network I/F, and transmits/receives various pieces of data, such as image data on which raster image processing has been performed and print setting data, to/from the printer controller 10A or the second image forming apparatus 50A through a network such as an intranet.

More specifically, the internal transmission/reception unit 31 receives image data, on which raster image processing has been performed, and print setting data corresponding to the image data. Next, the internal transmission/reception unit 31 transmits the image data determined to be corresponding to the front side of paper among the pieces of received image data, along with the corresponding print setting data to the second image forming apparatus 50A. In addition, the internal transmission/reception unit 31 receives image data, which is input from the image reading unit 54; and receives print setting data, which is input through the operation unit 55, from the internal transmission/reception unit 51. The internal transmission/reception unit 31, then, transmits the received image data and print setting data to the internal transmission/reception unit 15. The internal transmission/reception unit 31 serves as a transmission unit.

The recording unit 32 records, for example, image data and print setting data received by the internal transmission/reception unit 31.

The control unit 33 includes a CPU 33*a*, a RAM 33*b*, and a program memory 33*c*. The CPU 33*a* exerts centralized control over the first image forming apparatus 30A. The RAM 33*b* serves as a work memory to temporarily store various pieces of data when the CPU 33*a* executes a program. The program memory 33*c* stores a program to be read and executed by the CPU 33*a* and fixed data. The program memory 33*c* is composed of a ROM, and includes a front/back determining program c1 and a control program c2.

The front/back determining program c1 allows the CPU 33*a* to determine whether the image data corresponds to the front side of paper or corresponds to the back side of paper.

More specifically, the CPU 33*a* determines that the image data of odd number of pages 1, 3, 5, . . . is to be printed on the front side; and determines that the image data of even number of pages 2, 4, 6, . . . is to be printed on the back side, among a plurality of pieces of image data of a plurality of pages on which raster image processing has been performed. Here, the image data of an image to be printed on the front side is referred to as front-side data, and the image data of an image to be printed on the back side is referred to as back-side data.

The CPU 33*a*, which executes the front/back determining program c1, serves as a determining unit.

The control program c2 allows the CPU 33*a* to control the first image forming apparatus 30A to print an image based on back-side data, and to transmit front-side data to the second image forming apparatus 50A.

More specifically, the CPU 33*a* controls the printing section 34 to print the image data determined to be back-side data, and transmits the image data determined to be front-side data from the internal transmission/reception unit 31 to the second image forming apparatus 50A.

The printing section 34 includes units for printing, such as the paper feed unit 341, the paper conveying unit 342, the image forming unit 343, and the fixing unit 344. The printing section 34 controls the units contained therein, such as the image forming unit 343, in accordance with instructions of the CPU 33*a*, and prints the image of the image data, which has been received by the internal transmission/reception unit 31 and has been determined to be back-side data.

The second image forming apparatus 50A includes the internal transmission/reception unit 51, a recording unit 52, the control unit 53, the image reading unit 54, the operation unit 55, and the printing section 56, which are communicatively connected to one another with a bus 57.

The internal transmission/reception unit 51 includes an interface for communication, such as a network I/F, and receives front-side data transmitted from the internal transmission/reception unit 31 through a network such as an intranet.

The internal transmission/reception unit 51 transmits image data read by the image reading unit 54 and instructions input through the operation unit 55 to the first image forming apparatus 30A.

The recording unit 52 records, for example, image data and print setting data received by the internal transmission/reception unit 51.

The control unit 53, which includes a CPU, a RAM, and a ROM, reads various programs recorded in the ROM to execute various processes, and control each unit in the second image forming apparatus 50A.

More specifically, the control unit 53 controls the printing section 56 to print an image of front-side data based on the print setting data received by the internal transmission/reception unit 51. For example, when paper with an image of back-side data printed on its back side by the first image forming apparatus 30A is conveyed to the second image forming apparatus 50A, the control unit 53 controls conveyance of the paper for the printing section 56 to print an image of front-side data. After the printing, the control unit 53 ejects the paper with images printed on its both sides to a paper ejecting tray T.

The image reading unit 54 executes an optical scanning on the surface of an original fed by the ADF with a scanner, and reads the image as image signals (analog signals).

The operation unit 55 includes an LCD (or organic electroluminescence (EL) display) 551 and an operation display control unit. The operation unit 55 displays various setting screens and receives user's various operations. When receiving user's operation, the operation unit 55 generates operation signals and outputs the signals to the control unit 53.

Since the printing section 56 has a configuration similar to the printing section 34 of the first image forming apparatus 30A, repetitive explanations are omitted.

An exemplary flow of image formation processing by the image forming system 1 of the first embodiment is described below with reference to FIG. 3 which shows relationship between a timing of raster image processing by the image forming system 1 and a timing of image formation in each image forming apparatus.

Figure 3:
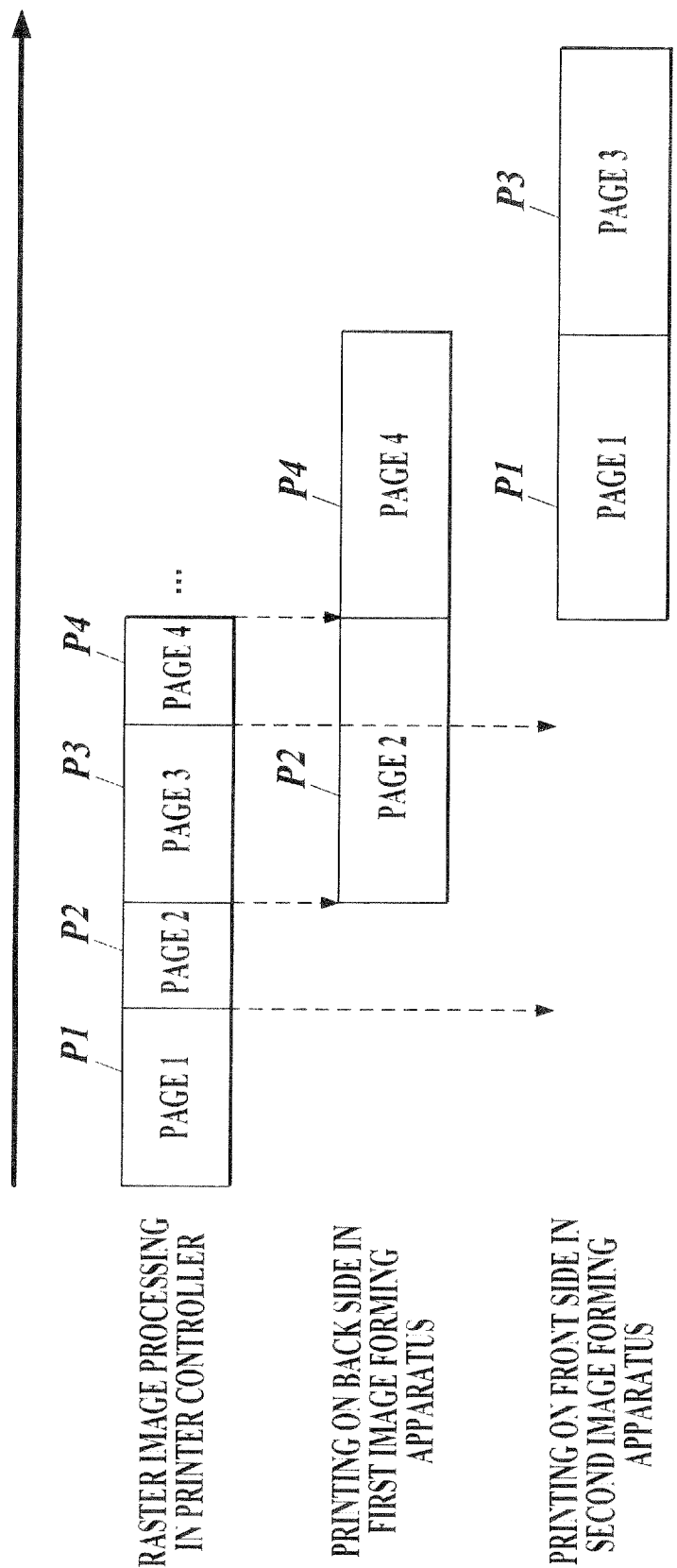
FIG. 3 shows an exemplary relationship between a timing of raster image processing by the image forming system of FIG. 1 and a timing of image formation in each image forming apparatus.

The solid arrow in FIG. 3 indicates the order of pages for which raster image processing is performed. The solid arrow corresponds to passage of time from the start of raster image processing. The RIP 14 of the printer controller 10A performs raster image processing on image data composed of data of a plurality of pages in order of page from the first page. The image data of pages 1, 2, 3, 4, . . . for which raster image processing has been completed is referred to as image data P1, P2, P3, P4, . . . respectively, in the order of the completion.

The dashed arrow in FIG. 3 indicates transmission of backside data, on which raster image processing has been done, from the printer controller 10A to the first image forming apparatus 30A; or indicates transmission of front-side data, on which raster image processing has been done, from the printer controller 10A to the second image forming apparatus 50A through the first image forming apparatus 30A.

The image data P1 of page 1 on which image raster image processing is done first is transmitted from the internal transmission/reception unit 15 to the first image forming apparatus 30A and is recorded in the recording unit 32. The image data P1 transmitted to the first image forming apparatus 30A is determined to be an image data corresponding to the front side by the CPU 33a. After that, the image data P1 is transmitted to the second image forming apparatus 50A by the internal transmission/reception unit 31, and is recorded in the recording unit 52.

Next, the image data P2 of page 2 on which raster image processing is done is transmitted to the first image forming apparatus 30A in the same manner as the image data P1, and is recorded in the recording unit 32. Then, the CPU 33a determines whether the recorded image data P2 is a front-side data or back-side data. The image data P2 which is determined to be back-side data is printed by the printing section 34. When the image of the image data P2 is to be printed on paper, the image data P1 has already been transmitted to the second image forming apparatus 50A. Therefore, as soon as the first image forming apparatus 30A completes the printing of the image data P2, the paper is conveyed to the second image forming apparatus 50A and the image of image data P1 is printed. After the second image forming apparatus 50A prints the image data P1, the control unit 53 controls the printing section 56 to eject paper with images printed on its both sides.

When raster image processing on the image data P2 is completed, the RIP 14 performs raster image processing on the image data P3 of page 3. Subsequent processing is equivalent to the processing for the image data P1 or image data P2, and therefore, repetitive explanations are omitted.

Figure 4:
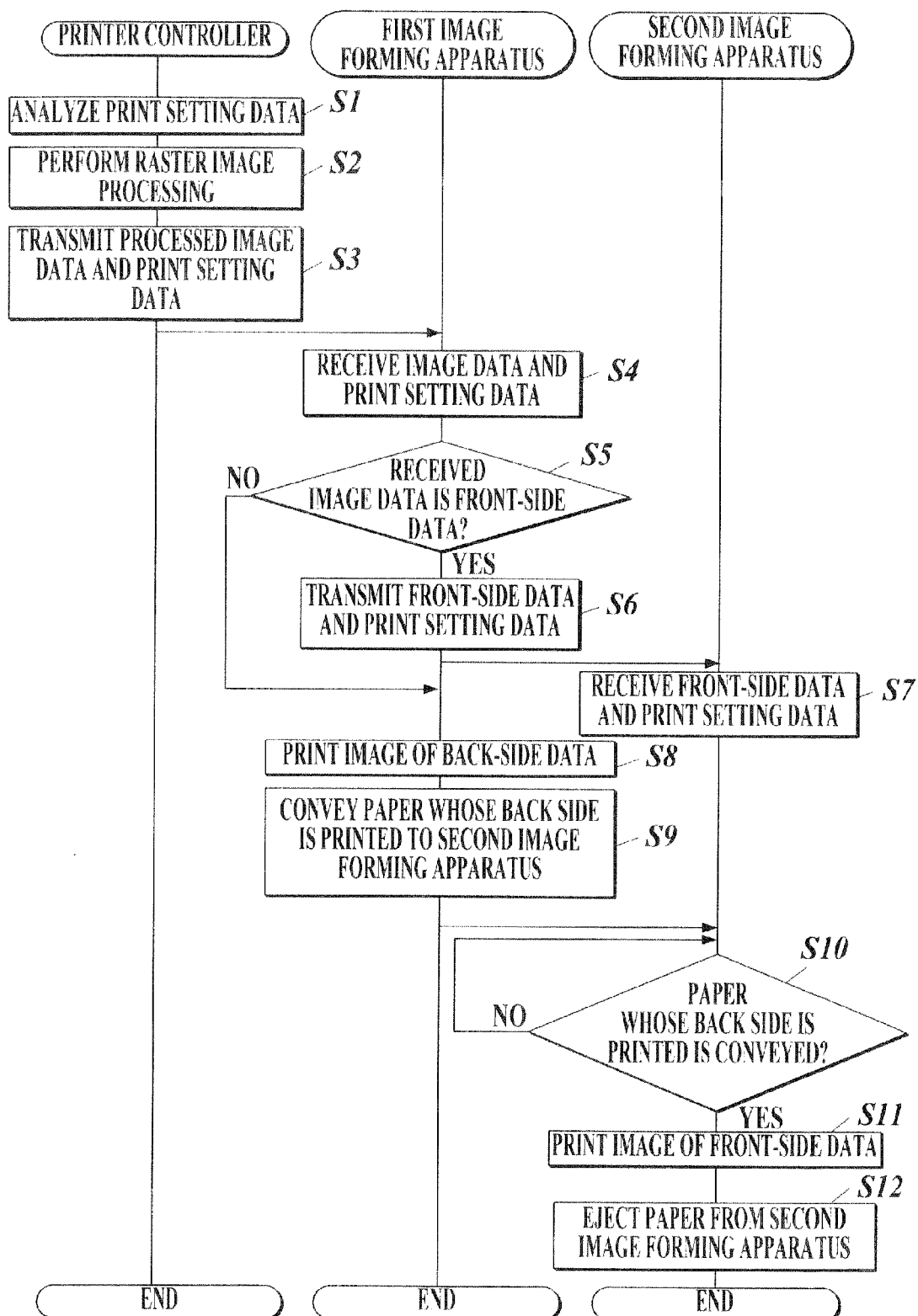
FIG. 4 is a flowchart illustrating image forming processing by the image forming system of FIG. 2.

Next, the image formation processing by the image forming system 1 is described below with reference to the flowchart shown in FIG. 4.

When a user provides an instruction for printing data created with an application installed on the client PC 70, such as an application of word processor and spreadsheet, the client PC 70 converts image data from an application file format into a PDL file format. The client PC 70 transmits the image data in the PDL file format to the printer controller 10A.

The control unit 13 of the printer controller 10A analyzes print setting data corresponding to the image data received by the external transmission/reception unit 11 (Step S1). Next, the RIP 14 performs raster image processing to convert the PDL image data into image data in a bitmap format based on the analyzed print setting data (Step S2). The internal transmission/reception unit 15 transmits image data on which raster image processing has been performed and print setting data to the first image forming apparatus 30A (Step S3).

Next, the internal transmission/reception unit 31 of the first image forming apparatus 30A receives the image data and print setting data (Step S4). Then the CPU 33a determines whether the image data received by the internal transmission/reception unit 31 is the image data corresponding to the front side of paper (front-side data) (Step S5). If the received image data is the image data corresponding to the front side of paper (Step S5: Yes), the CPU 33a determines the image data to be front-side data, and transmits the front-side data with print setting data from the internal transmission/reception unit 31 to the second image forming apparatus 50A (Step S6). Next, the control unit 53 of the second image forming apparatus 50A allows the internal transmission/reception unit 51 to receive the front-side data and the print setting data (Step S7).

If the image data received by the internal transmission/reception unit 31 is not the image data corresponding to the front side of paper (Step S5: No), the CPU 33a controls the printing section 34 to print the image of back-side data (Step S8). When the image of back-side data is printed in Step S8, the CPU 33a conveys the paper whose back side is printed to the second image forming apparatus 50A (Step S9).

The control unit 53 of the second image forming apparatus 50A determines whether the paper whose back side is printed has been conveyed from the first image forming apparatus 30A (Step S10). If the paper whose back side is printed has been conveyed (Step S10: Yes), the control unit 53 controls the printing section 56 to print the image of front-side data (Step S11). Then, the control unit 53 ejects the paper with images printed on its both sides from a paper ejecting tray T, and ends the processing (Step S12). If the paper whose back side is printed has not been conveyed in Step S10 (Step S10: No), the control unit 53 waits for the paper whose back side is printed to be conveyed to the second image forming apparatus 50A.

As described above, the image forming system 1 of the first embodiment includes two image forming apparatuses connected in series in the paper conveyance direction. The CPU 33a of the control unit 33 included in the first image forming apparatus 30A determines whether the image data is front-side data which corresponds to the front side of paper or whether the image data is back-side data which corresponds to the back side of paper, based on the image data obtained by processing print data composed of data of a plurality of pages in order of page. The CPU 33a controls the first image forming apparatus 30A to print the image based on back-side data. The control unit 53 included in the second image forming apparatus 50A controls the second image forming apparatus 50A to print the image based on front-side data. Therefore, in the case of performing duplex printing, when printing on one side of paper is completed by the first image forming apparatus 30A, the second image forming apparatus 50A is already ready for printing on the other side of the paper. Accordingly, as soon as printing on one side of paper is completed, printing on the other side of the paper can be started. This eliminates the need for paper to wait between printing on one side and printing on the other side.

Therefore, in the case where two image forming apparatuses are connected in series in the paper conveyance direction, duplex printing can be performed without providing a complicated mechanism for the paper to wait between the two image forming apparatus.

The CPU 33a serving as a determining unit is included in the first image forming apparatus 30A which transmits image data corresponding to the front side of paper to the second image forming apparatus 50A. The CPU 33a performs raster image processing on image data composed of data of a plurality of pages in order of page. Therefore, printing is not started until raster image processing on image data of both sides of paper is completed. That is, paper whose one side is printed does not need to wait before printing on the other side of the paper is started. This prevents paper from being subjected to deforming stress which would be applied when the paper stays to wait for the other-side printing.

Second Embodiment

The schematic configuration diagram of an image forming system 2 in the second embodiment is the same as that of the image forming system 1 in the first embodiment shown in FIG. 1. Therefore, the schematic configuration diagram for the second embodiment is omitted.

Figure 5:
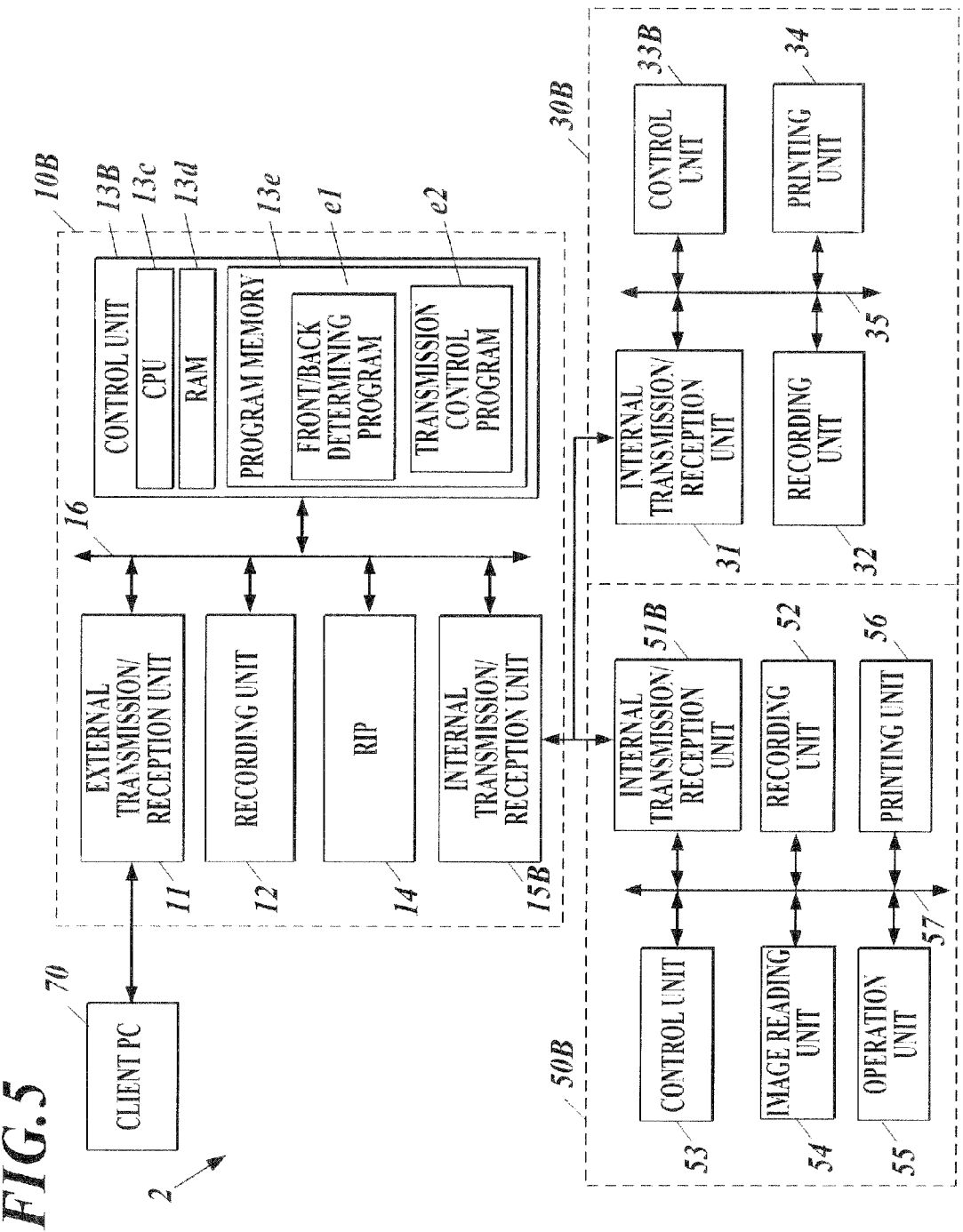
FIG. 5 is a block diagram illustrating main components of an image forming system according to another embodiment of the present invention.

FIG. 5 is a block diagram illustrating functional components of the image forming system 2 according to the second embodiment of the present invention.

The functional components of the image forming system 2 in the second embodiment are mostly the same as those of the image forming system 1 in the first embodiment, and only the different parts are described below.

In the image forming system 2 as shown in FIG. 5, a printer controller 10B transmits image data, which has been determined to be front-side data or back-side data by the CPU 13c, to each image forming apparatus along with print setting data. More specifically, the printer controller 10B transmits image data (back-side data), which has been determined to be corresponding to the back side of paper, to the first image forming apparatus 30B along with print setting data; and transmits image data (front-side data), which has been determined to be corresponding to the front side of paper, to the second image forming apparatus 50B along with print setting data.

The second embodiment is the same as the first embodiment in that, after the first image forming apparatus 30B prints an image of back-side data on the back side of paper, the second image forming apparatus 50B prints an image of front-side data on the front side of the paper whose back side is already printed.

As for the relationship between a timing of raster image processing by the image forming system 2 and a timing of image formation in each image forming apparatus as shown in FIG. 3, the second embodiment is different from the first embodiment in that front-side data and back-side data are transmitted from the printer controller 10B directly to the respective image forming apparatuses in the second embodiment.

The control unit 13B of the printer controller 10B includes the CPU 13c, a RAM 13d, and a program memory 13e. The CPU 13c exerts centralized control over the printer controller 10B. The RAM 13d serves as a work memory to temporarily store various pieces of data when the CPU 13c executes a program. The program memory 13e stores a program to be read and executed by the CPU 13c and fixed data.

The program memory 13e is composed of a ROM, and includes a front/back determining program e1 and a transmission control program e2.

The front/back determining program e1 allows the CPU 13c to determine whether image data corresponds to the front side of paper or corresponds to the back side of paper.

More specifically, the control unit 13c analyzes print setting data received by the external transmission/reception unit 11. When acquiring instruction information of printing conditions, the control unit 13c executes the front/back determining program e1 and determines whether the image data received by the external transmission/reception unit 11 is front-side data or back-side data.

The CPU 13c, which executes the front/back determining program e1, serves as a determining unit.

The transmission control program e2 allows back-side data to be transmitted to the first image forming apparatus 30B, and allows front-side data to be transmitted to the second image forming apparatus 50B.

More specifically, the CPU 13c executes the transmission control program e2 so as to transmit back-side data to the first image forming apparatus 30B and transmit front-side data to the second image forming apparatus 50B through the internal transmission/reception unit 15B.

The internal transmission/reception unit 15B, which serves as a transmission unit, transmits image data (back-side data) corresponding to the back side of paper to the first image forming apparatus 30B along with print setting data. The internal transmission/reception unit 15B transmits image data (front-side data) corresponding to the front side of paper to the second image forming apparatus 50B along with print setting data.

The control unit 33B of the first image forming apparatus 30B, which includes a CPU, a RAM, and a ROM, reads various programs recorded in the ROM to execute various processes, and control each unit in the first image forming apparatus 30B.

More specifically, the control unit 33B controls the printing section 34 to print an image of back-side data based on the print setting data received by the internal transmission/reception unit 31. For example, control unit 33B conveys paper to the printing section 34 and controls conveyance of the paper for the printing section 34 to print an image of back-side data. After the printing, the control unit 33B transmits the paper whose back side is printed to the second image forming apparatus 50B through a conveyance path.

The internal transmission/reception unit 51B of the second image forming apparatus 50B receives front-side data transmitted from the internal transmission/reception unit 15B of the printer controller 10B.

The control unit 53, then, controls the printing section 56 to print the image of the front-side data based on the print setting data received by the internal transmission/reception unit 51B.

Next, the image formation processing by the image forming system 2 is described below with reference to FIGS. 5 and 6.

FIG. 6 is a flowchart showing an example of image forming processing by the image forming system 2. The image formation processing of the second embodiment is mostly the same as that of the first embodiment, and detailed explanations for the same pars are omitted. Only the different parts are described below.

In the same manner as the image formation processing of the first embodiment, after the CPU 13c of the printer controller 10B analyzes print setting data (Step S21), the RIP 14 performs raster image processing to convert the PDL image data into bitmap image data (Step S22), as shown in FIG. 6.

Then the CPU 13c determines whether the image data on which raster image processing has been performed is front-side data (Step S23). If the image data on which raster image processing has been performed is front-side data (Step S23: Yes), the internal transmission/reception unit 15B transmits the image data as front-side data to the second image forming apparatus 50B along with print setting data (Step S24). The internal transmission/reception unit 51B of the second image forming apparatus 50B receives the front-side data and the print setting data transmitted from the internal transmission/reception unit 15B (Step S25).

If the image data on which raster image processing has been performed is not front-side data (Step S23: No), the internal transmission/reception unit 15B transmits the image data as back-side data to the first image forming apparatus 30B along with print setting data (Step S26).

The internal transmission/reception unit 31 of the first image forming apparatus 30B receives the back-side data and the print setting data transmitted from the internal transmission/reception unit 15B (Step S27). Then, the printing section 34 prints the image of the received back-side data (Step S28). When the printing by the printing section 34 is completed in Step S28, the control unit 33B conveys the paper whose back side is printed to the second image forming apparatus 50B (Step S29).

Then, the control unit 53 of the second image forming apparatus 50B determines whether the paper whose back side is printed has been conveyed from the first image forming apparatus 30B (Step S30). If the paper whose back side is printed has been conveyed (Step S30: Yes), the printing section 56 prints the image of front-side data on the front side of the paper whose back side is printed (Step S31). After that, the control unit 53 ejects the paper with images printed on its both sides from a paper ejecting tray T, and ends the processing (Step S32). If the paper whose back side is printed has not been conveyed in Step S30 (Step S30: No), the control unit 53 waits for the paper whose back side is printed to be conveyed to the second image forming apparatus 50B.

As described above, according to the image forming system 2 of the second embodiment, the CPU 13c transmits back-side data to the first image forming apparatus 30B, and transmits front-side data to the second image forming apparatus 50B. Accordingly, as soon as printing on one side of paper is completed, printing on the other side of the paper can be started. This eliminates the need for paper to wait between printing on one side and printing on the other side.

Further, the control unit of each image forming apparatus prints an image in accordance with the print setting data corresponding to the image. Therefore, duplex printing can be performed without conducting a complicated communication for the paper to wait between printing on one side and printing on the other side.

The present invention is not limited to the embodiments described above, but various improvements and/or modifications may be made without departing from the sprit of the present invention.

For example, the printer controller may be provided separately from the first image forming apparatus and the second image forming apparatus, or may be included in the first image forming apparatus or the second image forming apparatus. Alternatively, all of the printer controller, the first image forming apparatus, and the second image forming apparatus may be integrally provided.

In the embodiments, a control unit is included in each of the first image forming apparatus and the second image forming apparatus. Alternatively, a control unit may be provided separately from each of the first image forming apparatus and the second image forming apparatus, or one control unit may control both of the first image forming apparatus and the second image forming apparatus.

As a computer readable medium to contain the program according to the present invention, a nonvolatile memory such as a flash memory or a portable recording medium such as a CD-ROM may be used.

A carrier wave may also be used as a medium for providing data of a program according to the present invention through a communication line.

The entire disclosure of Japanese Patent Application No. 2011-281361 filed on Dec. 22, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image forming system to print an image based on image data obtained by processing print data composed of data of a plurality of pages in order of page, the image forming system comprising:

a plurality of image forming apparatuses connected in series in a paper conveyance direction, wherein the image forming apparatuses include: (i) a first image forming apparatus that forms an image on paper, and (ii) a second image forming apparatus disposed downstream of the first image forming apparatus in the paper conveyance direction; and a printer controller comprising a CPU and connected to the first image forming apparatus and the second image forming apparatus, wherein the printer controller is configured to:
  (i) perform control to process the print data composed of the data of the plurality of pages in order of page to obtain the image data, wherein the printer controller completes processing of one complete page of the print data before beginning processing of a next consecutive complete page of the print data;
  (ii) determine whether the image data corresponding to one complete page of the print data is front-side data or back-side data at a time of duplex printing, based on a page number of the one complete page of the print data, the front-side data corresponding to a front side of the paper, the back-side data corresponding to a back side of the paper; and
  (iii) transmit the front-side data corresponding to a first complete page of the print data to the second image forming apparatus, and transmit the back-side data corresponding to a second complete page of the print data that is consecutive to said first complete page of the print data corresponding to the front-side data, to the first image forming apparatus;

wherein for each set of two consecutive first and second complete pages of the print data corresponding respectively to front-side data and back-side data, the printer controller is configured to perform control to process the first complete page of the print data corresponding to the front-side data before processing the second complete page of the print data corresponding to the back-side data, wherein the printer controller is configured to transmit the front-side data corresponding to the first complete page of the print data to the second image forming apparatus after processing of the first complete page of the print data corresponding to the front-side data is completed, and transmit the back-side data corresponding to the second complete page of the print data to the first image forming apparatus after processing of the second complete page of the print data corresponding to the back-side data is completed, such that, for image data corresponding to each set of two consecutive first and second complete pages of the print data, the front-side data corresponding to the first complete page of the print data is transmitted to the second image forming apparatus before the back-side data corresponding to the second complete page of the print data is transmitted to the first image forming apparatus, and wherein, with respect to each set of two consecutive first and second complete pages of the print data, the second image forming apparatus is controlled to perform printing of an image based on the front-side data corresponding to the first complete page of print data after the first image forming apparatus completes printing of an image based on the back-side data corresponding to the second complete page of print data.

2. The image forming system according to claim 1, further comprising an intermediate unit that is disposed downstream of the first image forming apparatus and upstream of the second image forming apparatus in the paper conveyance direction, that turns over the paper conveyed from the first image forming apparatus, and that conveys the turned-over paper to the second image forming apparatus.

3. The image forming system according to claim 1, wherein:
the printer controller includes a rasterizer that rasterizes the print data; and
the image data to be transmitted is image data rasterized by the rasterizer.

4. A non-transitory computer readable medium having stored thereon a program that is executable by a computer of a printer controller which controls an image forming system to print an image based on image data obtained by processing print data composed of data of a plurality of pages in order of page, wherein the image forming system includes a plurality of image forming apparatuses connected in series in a paper conveyance direction, the image forming apparatuses including (i) a first image forming apparatus that forms an image on paper, and (ii) a second image forming apparatus disposed downstream of the first image forming apparatus in the paper conveyance direction, the printer controller being connected to the first image forming apparatus and the second image forming apparatus, wherein the program is executable by the computer to cause the computer to:

perform control to process the print data composed of the data of the plurality of pages in order of page to obtain the image data, wherein processing of one complete page of the print data is completed before processing of a next consecutive complete page of the print data is started;

determine whether the image data corresponding to one complete page of the print data is front-side data or back-side data at a time of duplex printing, based on a page number of the one complete page of the print data, the front-side data corresponding to a front side of paper, the back-side data corresponding to a back side of paper; and transmit the front-side data corresponding to a first complete page of the print data to the second image forming apparatus, and transmit the back-side data corresponding to a second complete page of the print data that is consecutive to said first complete page of the print data corresponding to the front-side data, to the first image forming apparatus;

wherein for each set of two consecutive first and second complete pages of the print data corresponding respectively to front-side data and back-side data, the program causes the computer to perform control to process the first complete page of the print data corresponding to the front-side data before processing the second complete page of the print data corresponding to the back-side data, wherein the program causes the computer to transmit the front-side data corresponding to the first complete page of the print data to the second image forming apparatus after processing of the first complete page of the print data corresponding to the front-side data is completed, and transmit the back-side data corresponding to the second complete page of the print data to the first image forming apparatus after processing of the second complete page of the print data corresponding to the back-side data is completed, such that, for image data corresponding to each set of two consecutive first and second complete pages of the print data, the front-side data corresponding to the first complete page of the print data is transmitted to the second image forming apparatus before the back-side data corresponding to the second complete page of the print data is transmitted to the first image forming apparatus, and wherein, with respect to each set of two consecutive first and second complete pages of the print data, the second image forming apparatus is controlled to perform printing of an image based on the front-side data corresponding to the first complete page of print data after the first image forming apparatus completes printing of an image based on the back-side data corresponding to the second complete page of print data.

5. A print control method for controlling an image forming system to print an image based on image data obtained by processing print data composed of data of a plurality of pages in order of page, wherein the image forming system includes (a) a plurality of image forming apparatuses connected in series in a paper conveyance direction, the image forming apparatuses including (i) a first image forming apparatus that forms an image on paper, and (ii) a second image forming apparatus disposed downstream of the first image forming apparatus in the paper conveyance direction, and (b) a printer controller comprising a CPU and connected to the first image forming apparatus and the second image forming apparatus, the method comprising:

performing control, with the printer controller, to process the print data composed of the data of the plurality of pages in order of page to obtain the image data, wherein processing of one complete page of the print data is completed before processing of a next consecutive complete page of the print data is started;

determining, with the printer controller, whether the image data corresponding to one complete page of the print data is front-side data or back-side data at a time of duplex printing, based on a page number of the one complete page of the print data, the front-side data corresponding to a front side of the paper, the back-side data corresponding to a back side of the paper; and transmitting, with the printer controller, the front-side data corresponding to a first complete page of the print data to the second image forming apparatus, and transmitting, with the printer controller, the back-side data corresponding to a second complete page of the print data that is consecutive to said first complete page of the print data corresponding to the front-side data, to the first image forming apparatus;

wherein for each set of two consecutive first and second complete pages of the print data corresponding respectively to front-side data and back-side data, control is performed to process the first complete page of the print data corresponding to the front-side data before processing the second complete page of the print data corresponding to the back-side data, wherein the front-side data corresponding to the first complete page of the print data is transmitted to the second image forming apparatus after processing of the first complete page of the print data corresponding to the front-side data is completed, and the back-side data corresponding to the second complete page of the print data is transmitted to the first image forming apparatus after processing of the second complete page of the print data corresponding to the back-side data is completed, such that, for image data corresponding to each set of two consecutive first and second complete pages of the print data, the front-side data corresponding to the first complete page of the print data is transmitted to the second image forming apparatus before the back-side data corresponding to the second complete page of the print data is transmitted to the first image forming apparatus, and wherein, with respect to each set of two consecutive first and second complete pages of the print data, the second image forming apparatus is controlled to perform printing of an image based on the front-side data corresponding to the first complete page of print data after the first image forming apparatus completes printing of an image based on the back-side data corresponding to the second complete page of print data.

6. The non-transitory computer readable medium according to claim 4, wherein the image forming system further comprises an intermediate unit that is disposed downstream of the first image forming apparatus and upstream of the second image forming apparatus in the paper conveyance direction, that turns over the paper conveyed from the first image forming apparatus, and that conveys the turned-over paper to the second image forming apparatus.

7. The non-transitory computer readable medium according to claim 4, wherein:
the printer controller includes a rasterizer that rasterizes the print data; and
the image data to be transmitted is image data rasterized by the rasterizer.

8. The print control method according to claim 5, wherein the image forming system further comprises an intermediate unit that is disposed downstream of the first image forming apparatus and upstream of the second image forming apparatus in the paper conveyance direction, that turns over the paper conveyed from the first image forming apparatus, and that conveys the turned-over paper to the second image forming apparatus.

9. The print control method according to claim 5, wherein:
the printer controller includes a rasterizer that rasterizes the print data; and
the image data to be transmitted is image data rasterized by the rasterizer.

10. The image forming system according to claim 1, wherein the image forming system forms an image on cut paper.

11. The non-transitory computer readable medium according to claim 4, wherein the image forming system forms an image on cut paper.

12. The print control method according to claim 5, wherein the image forming system forms an image on cut paper.

* * * * *